(12) United States Patent
Furukawa et al.

(10) Patent No.: US 8,914,977 B2
(45) Date of Patent: Dec. 23, 2014

(54) VEHICLE WHEEL AND METHOD FOR MANUFACTURING VEHICLE WHEEL

(75) Inventors: Masahide Furukawa, Aichi (JP); Hideyo Nehyo, Aichi (JP)

(73) Assignee: Central Motor Wheel Co., Ltd., Aichi (JP)

( * ) Notice: Subject to any disclaimer, the term of this patent is extended or adjusted under 35 U.S.C. 154(b) by 123 days.

(21) Appl. No.: 13/818,048

(22) PCT Filed: Sep. 22, 2011

(86) PCT No.: PCT/JP2011/071558
§ 371 (c)(1),
(2), (4) Date: Feb. 20, 2013

(87) PCT Pub. No.: WO2012/043350
PCT Pub. Date: Apr. 5, 2012

(65) Prior Publication Data
US 2013/0152395 A1    Jun. 20, 2013

(30) Foreign Application Priority Data
Oct. 1, 2010 (JP) .................................. 2010-223376

(51) Int. Cl.
*B60B 3/02* (2006.01)
*B60B 21/02* (2006.01)
*B21K 1/38* (2006.01)
*B60B 21/00* (2006.01)
*B21D 53/30* (2006.01)
*B60C 29/02* (2006.01)

(52) U.S. Cl.
CPC ................ *B21D 53/30* (2013.01); *B60B 21/00* (2013.01); *B60B 21/02* (2013.01); *B60C 29/02* (2013.01)
USPC ................... 29/894.35; 29/894; 29/894.354; 29/894.353; 301/91.105; 301/65; 301/63.109

(58) Field of Classification Search
USPC ............ 301/95.104, 95.105, 95.106, 63.106, 301/63.109, 65; 29/894.3, 894.31, 894.35, 29/894.353, 894.354, 894.32, 894.324
See application file for complete search history.

(56) References Cited

U.S. PATENT DOCUMENTS 5,350,220 A  *  9/1994  Atwell, Jr. .................... 301/5.21
5,641,208 A  *  6/1997  Stach ........................ 301/64.102

(Continued)

OTHER PUBLICATIONS

Microfilm of the specification and drawings annexed to the request of Japanese Utility Model Application No. 147045/1989 (Laid-open No. 85201/1991), (Topy Industries Ltd.), Aug. 29, 1991, Fig. 1, 2.

(Continued)

*Primary Examiner* — Sarang Afzali
*Assistant Examiner* — Jason L Vaughan
(74) *Attorney, Agent, or Firm* — McDermott Will & Emery LLP

(57) ABSTRACT

A vehicle wheel according to the present invention includes a hollow-state hollow portion and a solid-state non-hollow portion inside an outboard bead seat in a radial direction, which are provided in series in a circumferential direction of the wheel, the non-hollow portion having a cross section with a larger area than a hole cross section of a valve hole and having the valve hole formed therein. This structure prevents a sealing structure for ensuring hermetic performance from being complicated as compared to a wheel having the valve hole in the hollow portion, thus simplifying a mounting structure of an air valve. A method for manufacturing such a vehicle wheel allows formation of the valve hole in the non-hollow portion. Machining dust generated through a cutting process can thus be prevented from entering the hollow portion and remaining therein.

1 Claim, 7 Drawing Sheets

(56) References Cited

U.S. PATENT DOCUMENTS

| | | | | |
|---|---|---|---|---|
| 5,718,485 A | * | 2/1998 | Stach | 301/63.102 |
| 5,794,340 A | * | 8/1998 | Pollkotter | 29/894.324 |
| 6,231,129 B1 | * | 5/2001 | Stach | 301/65 |
| 6,447,071 B1 | * | 9/2002 | Griffin | 301/63.104 |
| 6,783,190 B1 | * | 8/2004 | Baumgartner | 301/64.102 |
| 7,346,984 B2 | * | 3/2008 | Baumgartner | 29/894.324 |
| 7,958,636 B2 | * | 6/2011 | Yoshimura | 29/894.32 |

OTHER PUBLICATIONS

International Search report issued in PCT/JP2011/071558, mailed on Dec. 27, 2011.

* cited by examiner (A)

(B)

(B)

(C)

(A)

(B)

US 8,914,977 B2

VEHICLE WHEEL AND METHOD FOR MANUFACTURING VEHICLE WHEEL

RELATED APPLICATIONS

This application is the U.S. National Phase under 35 U.S.C. §371 of International Application No. PCT/JP2011/071558, filed on Sep. 22, 2011, which in turn claims the benefit of Japanese Application No. 2010-223376, filed on Oct. 1, 2010, the disclosures of which Applications are incorporated by reference herein.

FIELD OF THE INVENTION

The present invention relates to a vehicle wheel in which a hollow-state hollow portion is formed in a rim and a method for manufacturing the same.

BACKGROUND

As a vehicle wheel in which a hollow-state hollow portion is formed in a rim, a wheel is suggested in which a hollow chamber (hollow portion) is shaped in a rim outer well along a circumferential direction proposed in Japanese Patent application Publication No. 2004-90925 (JP-A-2004-90925) (see Paragraph [0025] and FIG. 7), for example. Further, as a method for shaped the hollow chamber (hollow portion), a method for forming a vehicle wheel is disclosed in which an annular flange protruding outward in a radial direction from an outer surface of a rim is formed along the circumferential direction, the annular flange is processed to bent toward a rim outer flange (outboard flange) and welded thereto, and the hollow chamber (hollow portion) is thereby formed in the rim.

SUMMARY OF THE INVENTION

Generally, in a vehicle wheel, a valve hole for mounting an air valve is formed on an outboard side of a rim thereof. However, in a case of the vehicle wheel proposed in JP-A-2004-90925 (see Paragraph [0025] and FIG. 7), as shown in FIG. 7(A), since a hollow portion 81 is circumferentially formed in a portion inside in the radial direction of an outboard bead seat of the rim, a valve hole 82 has to be formed to pass through the hollow portion 81. Further, in order to ensure hermetic performance of a tire air chamber and the hollow portion 81, as shown in FIG. 7(B), an air valve 111 provided with prescribed seal members 112 and 113 in two places in the valve hole 82 is required to be mounted. This results in complicated air valve structure and mounting structure thereof and in troublesome mounting operation for the air valve.

Further, since the valve hole 82 is formed to pass through the hollow portion 81, machining dust can easily enter the hollow portion 81 while the valve hole 82 is processed. It is not preferable in view of quality that machining dust remains in the wheel in such a manner.

The present invention relates to a vehicle wheel in which a hollow-state hollow portion is formed in a rim and a method for manufacturing the same, and suggests a vehicle wheel which simplifies a mounting structure for mounting an air valve on the rim and prevents machining dust generated through a cutting process of a valve hole from entering the hollow portion and remaining therein, and a method for manufacturing the same.

DISCLOSURE OF THE INVENTION

Problem of the Invention

A vehicle wheel in accordance with the present invention includes a rim having: outboard and inboard bead seats for supporting a bead of a tire; and a valve hole provided inside in a radial direction of the outboard bead seat for mounting an air valve, in which a hollow-state hollow portion and a solid-state non-hollow portion are provided inside in the radial direction of the outboard bead seat and in series in a circumferential direction of the wheel, the non-hollow portion has a larger cross section than a hole cross section of the valve hole, and the valve hole is provided in the non-hollow portion.

In such a configuration, since the valve hole is provided in the non-hollow portion, compared to the wheel in which the valve hole is provided in the hollow portion, a sealing structure for ensuring hermetic performance does not become complicated, thus allowing simplification of the mounting structure of the air valve. Further, according to the shape of the non-hollow portion, an air valve used for common vehicle wheels can be used.

A configuration of the vehicle wheel described above in accordance with the present invention is suggested in which a thickness of the rim in a central axial direction of the valve hole is smaller in the non-hollow portion than in the hollow portion. Such a configuration can prevent weight increase due to extra metal. Further, in a case where an air valve with an air pressure sensor is mounted, the thickness of a portion where the valve hole is formed is reduced, thereby reducing the weight. This allows prevention of weight imbalance in the wheel due to the relatively heavy air valve.

Further, a configuration of the vehicle wheel in such a configuration is suggested in which the non-hollow portion has a shape whose portion on a tire air chamber side is thinned. Such a configuration can prevent weight imbalance in the wheel without influencing a design of a design surface. Further, the swelling amount of the air valve with an air pressure sensor swelling toward the tire air chamber side is reduced, thereby allowing prevention of impairment of the attachment ease of the tire.

Moreover, in a case where a seat surface for fixing or seating the air valve on the valve hole is formed, the non-hollow portion preferably has a larger cross section than the seat surface.

Meanwhile, a method for manufacturing the vehicle wheel in accordance with the present invention includes the steps of: forming an annular vertical wall which protrudes outward in the radial direction from an outer surface of the rim throughout the whole circumference, and forming a protruding portion which protrudes outward in the radial direction from the outer surface of the rim and has a larger cross section than a hole cross section of the valve hole and a recessed portion which has a smaller outer diameter than the protruding portion between an outboard flange and the vertical wall in series in a circumferential direction of the wheel; forming the outboard bead seat configured with the bent vertical wall formed by bending the vertical wall toward the outboard flange and joining an end portion of the vertical wall to the outboard flange throughout a whole circumference, a hollow-state hollow portion configured with the bent vertical wall and the recessed portion, and a solid-state non-hollow portion configured with the protruding portion; and forming the valve hole in the non-hollow portion by a cutting process, the steps being sequentially conducted.

In such a manufacturing method, since the valve hole is provided in the non-hollow portion, compared to a manufacturing method in which the valve hole is provided in the hollow portion, a sealing structure for ensuring hermetic performance does not become complicated, thus allowing simplification of the mounting structure of the air valve. Further, according to the shape of the non-hollow portion, an air valve used for common vehicle wheels can be used. Further, since the valve hole is formed in the non-hollow portion, machining dust generated through a cutting process can be prevented from entering the hollow portion and remaining therein.

Effect of the Invention

In the vehicle wheel of the present invention, the hollow-state hollow portion and the solid-state non-hollow portion are formed inside in the radial direction of the outboard bead seat and in series in the circumferential direction, the non-hollow portion has a larger cross section than the hole cross section of the valve hole, and the valve hole is provided in the non-hollow portion. Therefore, compared to the wheel in which the valve hole is provided in the hollow portion, the sealing structure for ensuring hermetic performance does not become complicated, thus allowing simplification of the mounting structure of the air valve.

In the method for manufacturing a vehicle wheel of the present invention, since the valve hole is provided in the non-hollow portion, compared to the manufacturing method in which the valve hole is provided in the hollow portion, the sealing structure for ensuring hermetic performance does not become complicated, thus allowing simplification of the mounting structure of the air valve. Further, since the valve hole is formed in the non-hollow portion, machining dust generated through a cutting process can be prevented from entering the hollow portion and remaining therein.

BRIEF DESCRIPTION OF DRAWINGS

FIG. 5 are explanatory views, in which FIG. 5(A) illustrates an intermediate molded body 51 after a casting step and a stepped portion processing step are completed, FIG. 5(B) illustrates a bending process step, and FIG. 5(C) illustrates the vehicle wheel 1 after a joining step and a cutting process step have been finished.

DETAILED DESCRIPTION

Figure 1:
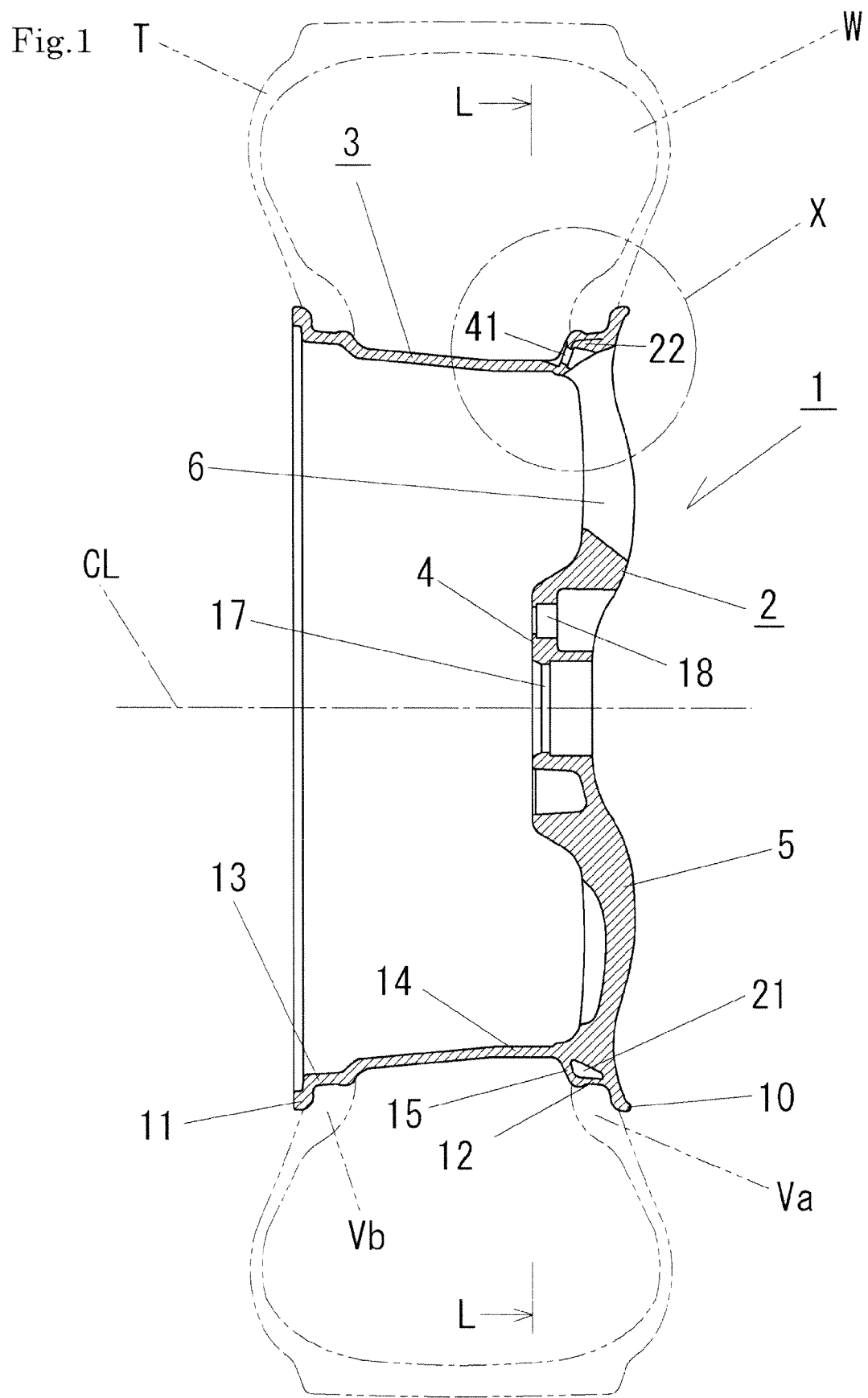
FIG. 1 is a vertical cross-sectional view of a vehicle wheel 1 in accordance with the present invention.
Figure 2:
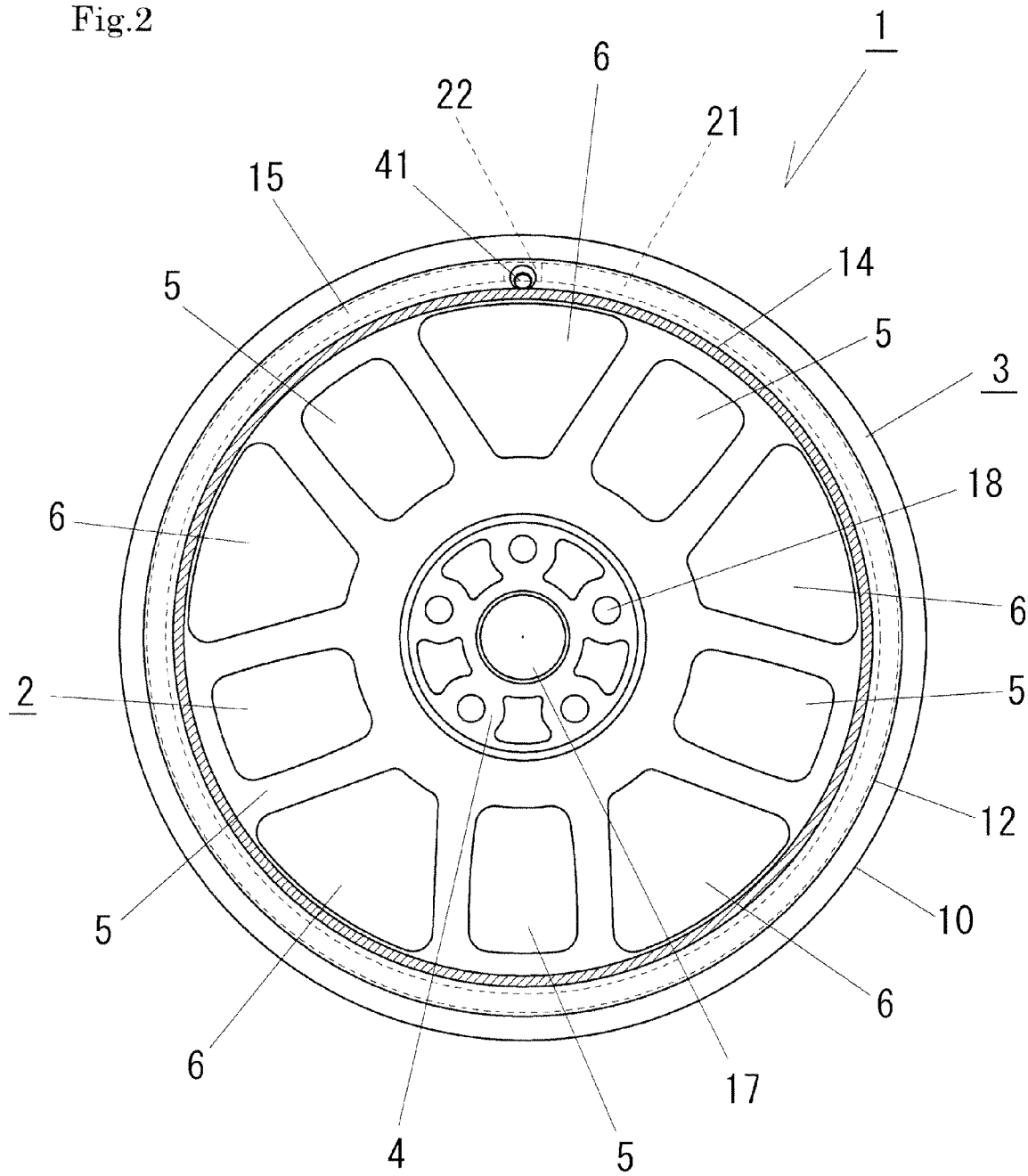
FIG. 2 is a cross-sectional view taken along line L-L in FIG. 1.
Figure 3:
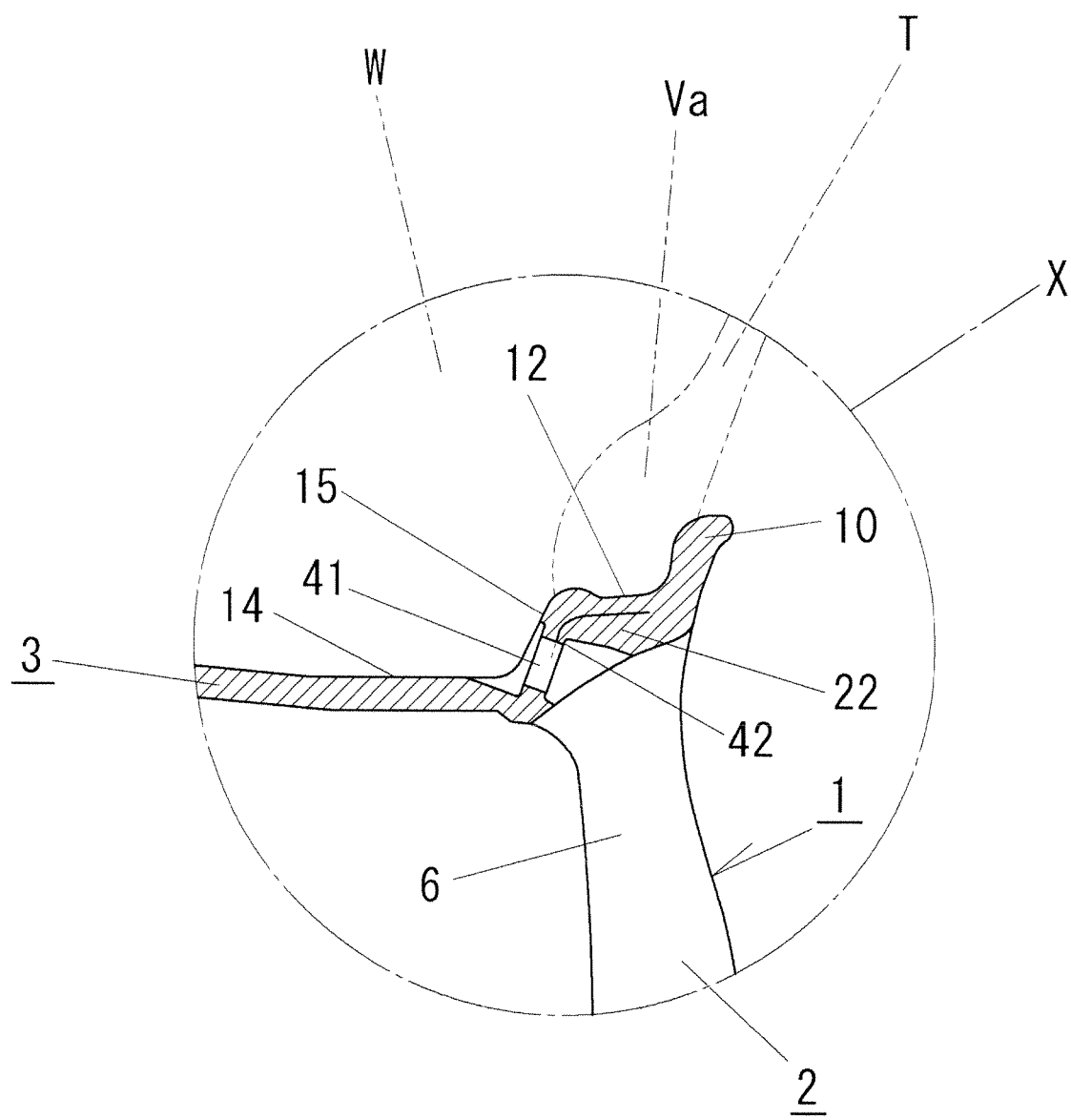
FIG. 3 illustrates an X portion in FIG. 1 on larger scale.
Figure 4:
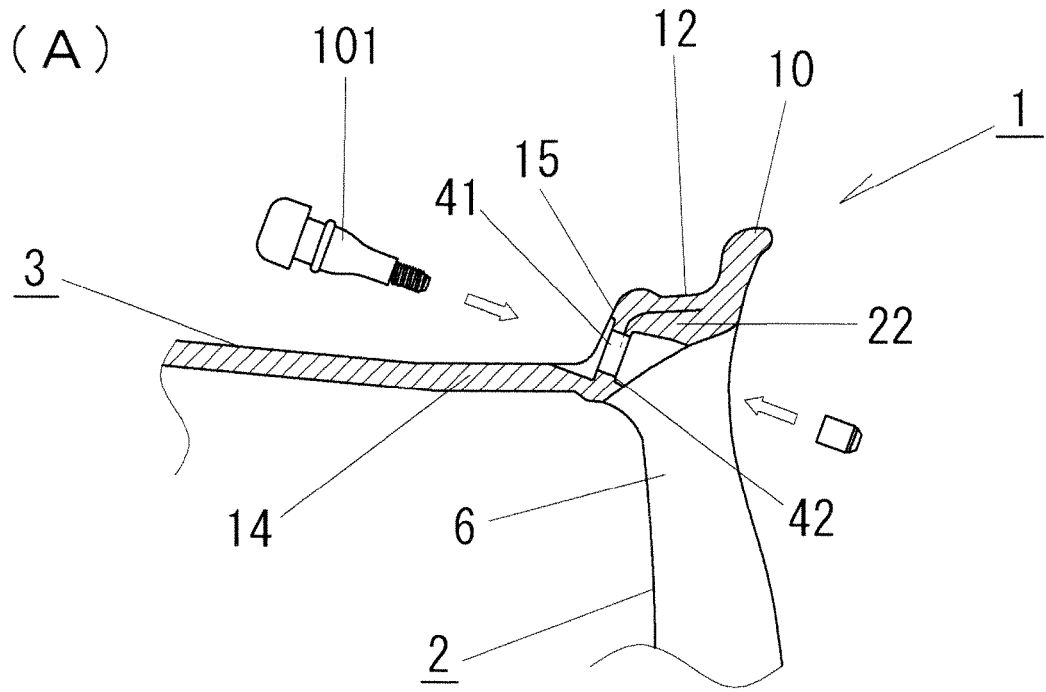
FIG. 4 is an explanatory view for illustrating a process for mounting an air valve 101 on a valve hole 41.
Figure 4:
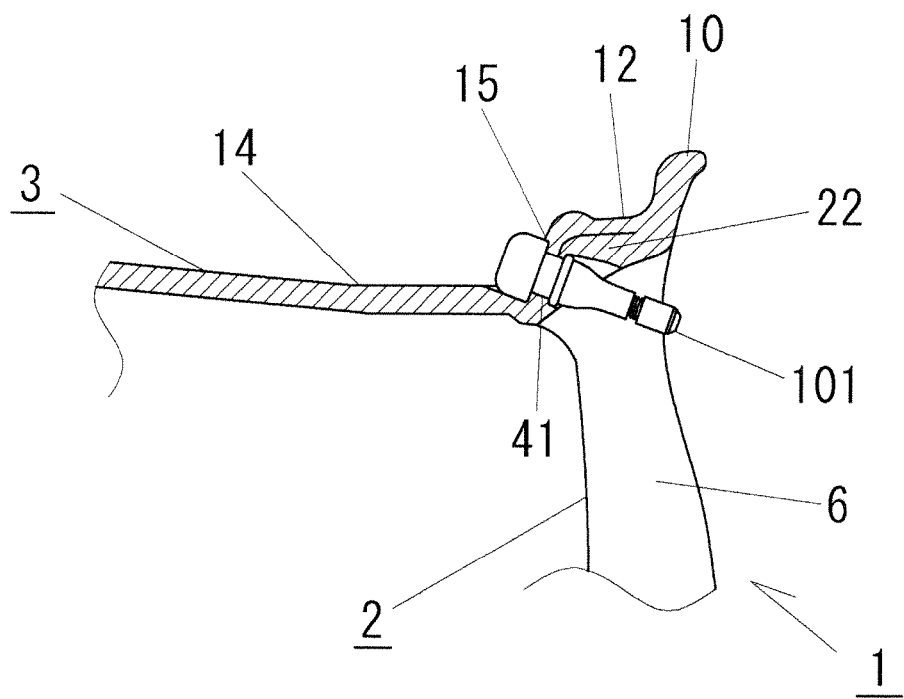

A vehicle wheel in accordance with the present invention will be described with reference to FIGS. 1 to 3. The vehicle wheel 1 is formed by unitarily molding an aluminum alloy by casting and includes a disc 2 to which an axle is coupled and a rim 3 on which a tire is mounted. When a tire T is mounted on the vehicle wheel 1, an annular tire air chamber W sealed by the rim 3 and the tire T is formed. In descriptions in this embodiment, the surface on a side which is visually recognized when the vehicle wheel 1 is mounted on a vehicle is referred to as design surface. The design surface side is referred to as outboard side, and the opposite side to the design surface is referred to as inboard side. Further, the direction toward the central axial line CL of the vehicle wheel 1 along the radial direction which is orthogonal to the central axial line CL is referred to as inside in the radial direction, and its opposite direction is referred to as outside in the radial direction.

The disc 2 includes a generally disc-shaped hub mount portion 4 and a plurality of spoke portions 5 provided outward in the radial direction from an outer rim of the hub mount portion 4 in a radial pattern. Here, the hub mount portion 4 has a hub hole 17 at its center and a plurality of bolt holes 18 in positions at regular intervals to each other in the circumferential direction (the circumferential direction of the wheel), outside the hub hole 17. Respective ornamental holes 6 are formed between the neighboring spoke portions 5.

Further, in the rim 3, an outboard flange 10 and an inboard flange 11 that hold beads Va and Vb of the tire T from their sides are formed at both ends of the outboard and inboard sides of the rim 3. Moreover, an outboard bead seat 12 and an inboard bead seat 13 for seating the beads Va and Vb of the tire T and thereby to support and fix them are formed such that the bead seats are continuously formed with the outboard flange 10 and the inboard flange 11. In addition, between the outboard bead seat 12 and the inboard bead seat 13, a well portion 14 having a smaller diameter than the outboard bead seat 12 for dropping the bead Va of the tire T when the tire is mounted is formed. A well wall portion 15 is formed to connect together the outboard bead seat 12 and the well portion 14 that have different diameters.

Further, in the vehicle wheel 1, a hollow-state hollow portion 21 and a solid-state non-hollow portion 22 are provided inside in the radial direction of the outboard bead seat 12 of the rim 3 and in series in the circumferential direction. The hollow portion 21 is formed almost throughout the whole circumference. Moreover, since the hollow portion 21 is formed almost throughout the whole circumference, the non-hollow portion 22 is formed to separate the annularly formed hollow portion 21. Accordingly, in this embodiment, the non-hollow portion 22 is also referred to as partition wall 22.

In the rim 3, in order to mount an air valve 101, a valve hole 41 is formed which passes through the non-hollow portion 22 including the well wall portion 15 and penetrates from the outboard side into the tire air chamber W. In the valve hole 41, a circularly shaped seat surface 42 for seating the air valve 101 is also formed. The non-hollow portion 22 is formed to have a larger cross section than a hole cross section of the valve hole 41 and the cross section of the seat surface 42. Therefore, neither the valve hole 41 nor the seat surface 42 passes through the hollow portion 21 and the valve hole 41 is thus not provided in the hollow portion 21. Accordingly, in the vehicle wheel 1, the valve hole 41 can be formed into a shape on which the air valve 101 used for common vehicle wheels can be mounted. In other words, compared to the wheel in which the valve hole 41 is provided in the hollow portion 21, a sealing structure for ensuring hermetic performance does not become complicated, thus allowing simplification of the mounting structure of the air valve 101.

According to such a vehicle wheel 1 of this embodiment, the hollow-state hollow portion 21 and the solid-state non-hollow portion 22 are formed inside in the radial direction of the outboard bead seat 12 and continuously in the circumferential direction, the non-hollow portion 22 has a larger cross section than the hole cross section of the valve hole 41, and the valve hole 41 is provided in the non-hollow portion 22. Therefore, compared to the wheel in which the valve hole 41 is provided in the hollow portion 21, the sealing structure for ensuring hermetic performance does not become complicated, thus allowing simplification of the mounting structure of the air valve 101.

Next, a manufacturing method for manufacturing the abovementioned vehicle wheel 1 of this embodiment will be described.

In the manufacturing method of this embodiment, a casting step for forming a cast molded body by casing is first conducted. A stepped portion processing step, a spinning process step, and a joining step for forming the outboard bead seat 12, the hollow portion 21, and the non-hollow portion 22 are then conducted. Thereafter, a cutting process step for processing the wheel into a product shape is conducted, and a drilling process step for forming the valve hole 41 is further conducted. In the manufacturing method, a heat treatment step, a painting step, other processing steps, and so forth are appropriately conducted. However, since those are not essential parts of the present invention and conventional methods can be applied thereto, detailed descriptions will be omitted.

In the casting step, molten metal of an aluminum alloy heated and kept at a prescribed temperature is filled in a cavity of a casting die and cooled, and the cast molded body which is not shown is thereafter taken out therefrom. The cast molded body which is molded by the casting step is in a shape having extra metal throughout the vehicle wheel 1. In this casting step, conventionally used casting methods such as high pressure casting, low pressure casting, and gravity casting can be applied, and detailed descriptions will be omitted.

Figure 5:
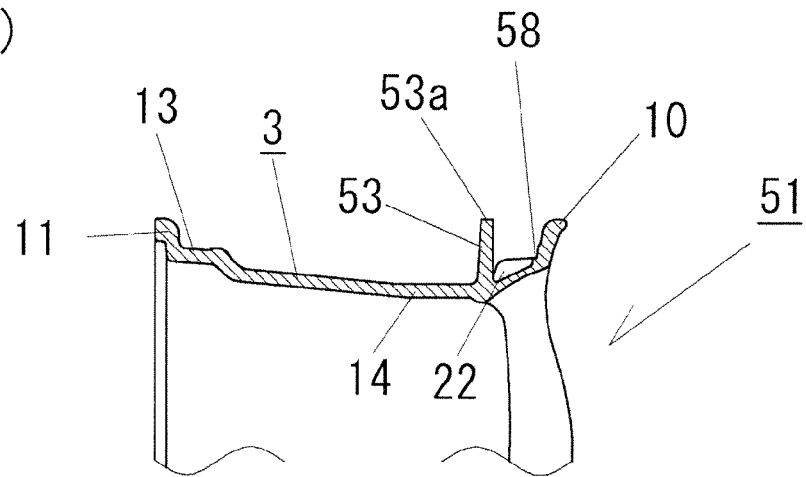
Figure 5:
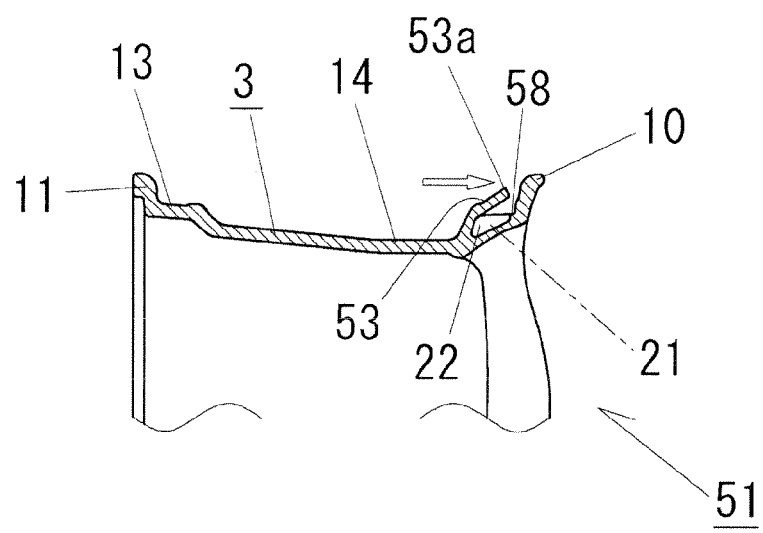
Figure 5:
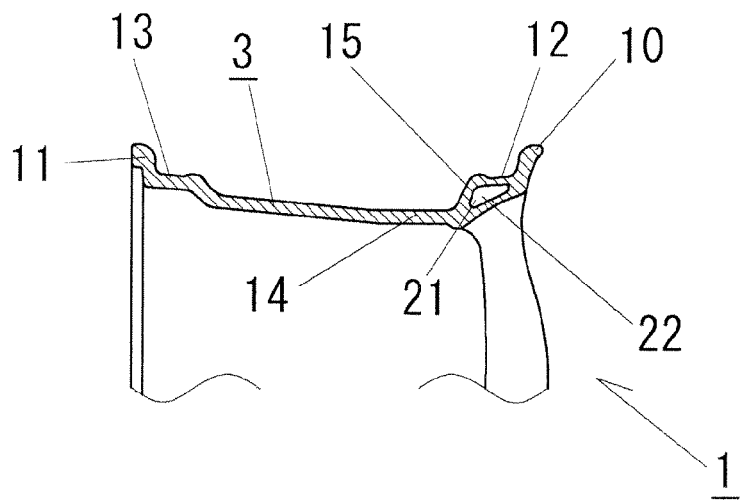

The stepped portion processing step is next conducted. In the stepped portion processing step, the extra metal on the cast molded body is removed by cutting, thereby forming the shape of an intermediate molded body 51 of the wheel. At this point, a step-shaped engagement stepped portion 58 having a surface facing outside in the radial direction and a surface facing the inboard side is formed throughout the whole circumference by cutting, in a position on the inboard side of the outboard flange 10 and slightly inside in the radial direction of the outer diameter of the outboard bead seat 12 which is formed in a subsequent step. The intermediate molded body 51 molded in such a manner is shown in FIG. 5(A). Here, for more simplified descriptions, descriptions will be made by giving the portions of the intermediate molded body 51 the same names and reference numerals and symbols as the portions in which the respective structure of the vehicle wheel 1 are formed. As shown in the drawings, the intermediate molded body 51 has the outboard flange 10, the well portion 14, the inboard bead seat 13, the inboard flange 11, and the engagement stepped portion 58 that are formed on the rim 3. An annular vertical wall 53 protruding outward in the radial direction from an outer surface of the well portion 14 is formed throughout the whole circumference in a portion close to the outboard flange 10 of the well portion 14. Further, the partition wall 22 which partially protrudes outward in the radial direction from an outer surface of the rim 3 is formed between the outboard flange 10 and the vertical wall 53 of the rim 3. The partition wall 22 protrudes such that it has the same diameter as the engagement stepped portion 58. Accordingly, the circumferential shape between the outboard flange 10 and the vertical wall 53 of the rim 3 is formed in a shape such that a protruding portion in which the partition wall 22 is formed and the other recessed portion are formed continuously in the circumferential direction. In the embodiment, the protruding and recessed portions are formed in the stepped portion processing step. However, it may be molded in the casting step.

The spinning process step is next conducted. In the spinning process step, the vertical wall 53 is bent toward the outboard flange 10 side by a spinning process. FIG. 5(B) shows a manner of the spinning process step. In the spinning process step, while the intermediate molded body 51 is rotated around its center axial line CL as the rotational center at a prescribed rotational speed, a roller-shaped bending tool (not shown) for a spinning process is pressed onto the vertical wall 53 from its inboard side and is moved toward the outboard side, thereby bending the vertical wall 53. An end portion 53a of the vertical wall 53 is engaged with the engagement stepped portion 58 of the outboard flange 10.

The joining step and the cutting process step are next conducted. In the joining step, the end portion 53a of the vertical wall 53 which has been bent by the spinning process step and the outboard flange 10 are welded together throughout the whole circumference, thereby joining those together. In the cutting process step, cutting work is performed on a surface of the intermediate molded body 51 including the rim 3 to form it into a desired product shape of the vehicle wheel 1. FIG. 5(C) shows the vehicle wheel 1 after the cutting process step. As shown in FIG. 5(C), the outboard bead seat 12 and the well wall portion 15 are formed by the joining step and the cutting process step. In addition, inside in the radial direction of the outboard bead seat 12, the solid-state non-hollow portion 22 is formed in a portion where the partition wall 22 is present, and the hollow-state hollow portion 21 is formed in a portion where the partition wall 22 is not present.

The drilling process step is next conducted. The drilling process step is a step in which the valve hole 41 for mounting the air valve 101 is formed by a cutting process and a hole which passes through the non-hollow portion 22 including the well wall portion 15 and penetrates from the outboard side into the tire air chamber W is formed. In the valve hole 41, the circularly shaped seat surface 42 for seating the air valve 101 is also formed. Here, the partition wall (non-hollow portion) 22 shaped in the casting step and the stepped portion processing step is formed to have a larger cross section than the hole cross section of the valve hole 41 and the cross section of the seat surface 42. Therefore, the partition wall 22 has a structure in which neither the valve hole 41 nor the seat surface 42 passes through the hollow portion 21 and the valve hole 41 is thus not provided in the hollow portion 21. Accordingly, in the vehicle wheel 1 of this embodiment, the valve hole 41 can be formed into a shape on which the air valve 101 used for common vehicle wheels can be mounted. In other words, compared to the wheel in which the valve hole 41 is provided in the hollow portion 21, a seal structure for ensuring hermetic performance does not become complicated, thus allowing simplification of the mounting structure of the air valve 101. Moreover, since the valve hole 41 is formed in the non-hollow portion 22 and the valve hole 41 does not pass through the hollow portion 21, machining dust generated through the cutting process can be prevented from entering the hollow portion and remaining therein.

According to such a method for manufacturing the vehicle wheel 1 of this embodiment, since the valve hole 41 is formed in the non-hollow portion 22, compared to the manufacturing method which forms the valve hole 41 in the hollow portion 21, the sealing structure for ensuring hermetic performance does not become complicated, thus allowing simplification of the mounting structure of the air valve 101. Further, since the valve hole 41 is formed in the non-hollow portion 22, machining dust generated through the cutting process can be prevented from entering the hollow portion and remaining therein.

In the manufacturing method of the embodiment described above, the partition wall 22 is unitarily molded in the casting step. However, the partition wall 22 may not be formed in the casting step, but a partition wall which is separately molded instead of the partition wall 22 may be joined prior to the spinning process step.

Figure 6:
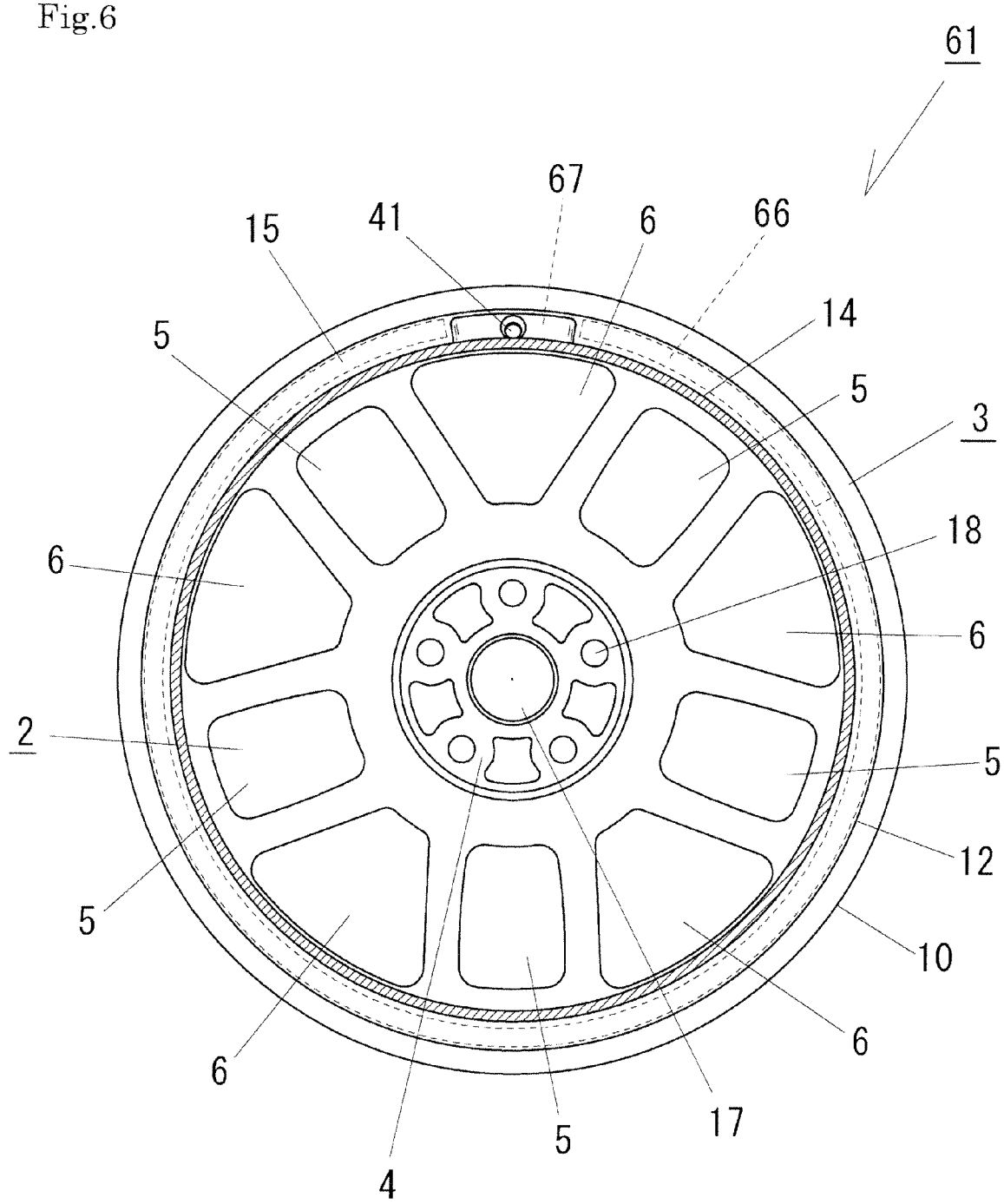
FIG. 6 is a horizontal cross-sectional view of a vehicle wheel 61 of another example, which is illustrated in the same manner as FIG. 2.
Figure 7:
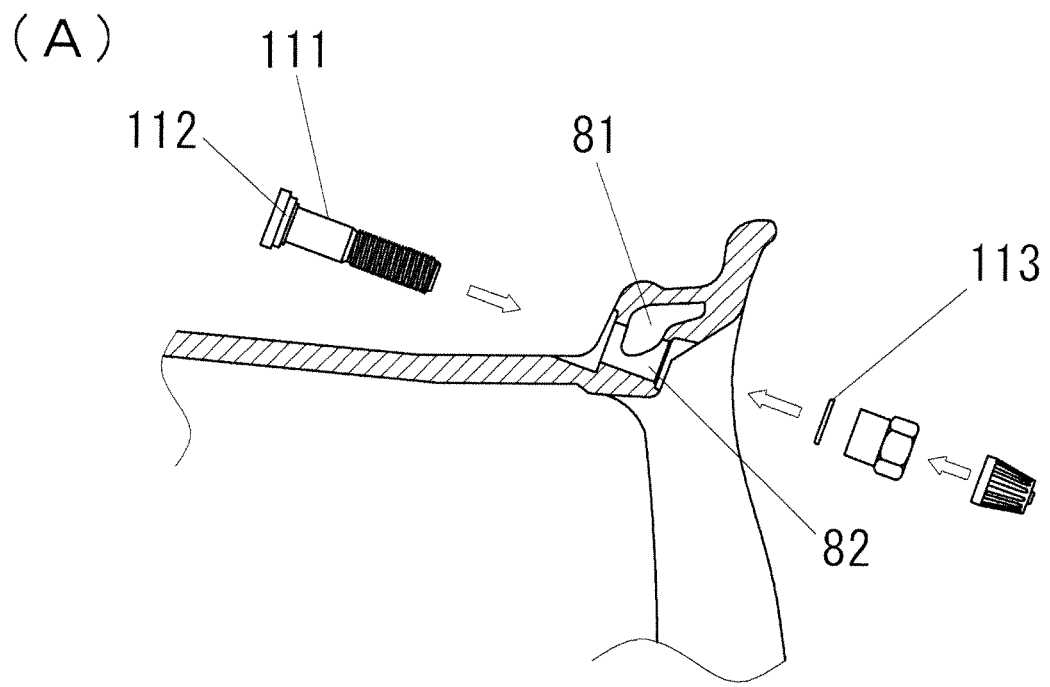
FIG. 7 are explanatory views for illustrating a process in which an air valve 111 is mounted on a valve hole 82 formed in a vehicle wheel 71 having a hollow portion 81 in a conventional configuration.
Figure 7:
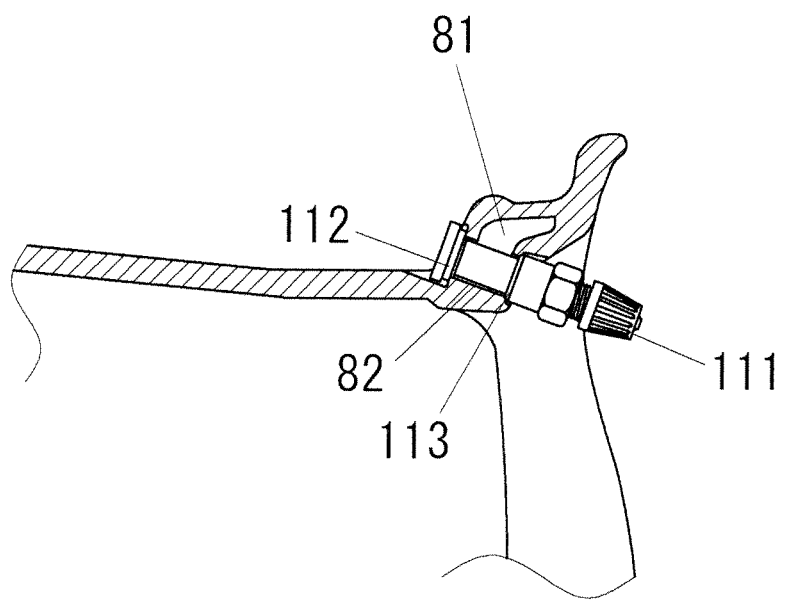

In the vehicle wheel 1 of the embodiment described above, the non-hollow portion 22 is formed to separate the annularly formed hollow portion 21. However, the vehicle wheel 1 may have a structure such that the non-hollow portion 22 separates the annularly formed hollow portion 21 and at the same time the well wall portion 15 is thinned from the tire air chamber W side. FIG. 6 shows this structure as another example of vehicle wheel 61. As shown in FIG. 6, the well wall portion 15 is thinned in a prescribed range on both sides of the valve hole 41 in the circumferential direction. Further, a hollow portion 66 is not formed in the portion where the well wall portion 15 is thinned. Moreover, the thickness of the rim in the central axial direction of the valve hole is thinner in a non-hollow portion 67 than in the hollow portion 66. In addition, an air valve with an air pressure sensor instead of the air valve 101 can be mounted on the vehicle wheel 61. Generally, an air valve with an air pressure sensor has a sensor section in a prescribed thickness along the well wall portion 15 on the tire air chamber W side of the air valve. In the vehicle wheel 61, the thinned portion of the well wall portion 15 allows reduction in the protrusion of the sensor section of the air valve with an air pressure sensor toward the tire air chamber W side. Further, weight imbalance in the vehicle wheel 61 due to the weight of the sensor section of the air valve with an air pressure sensor can be prevented.

The present invention is not limited to the configurations or the manufacturing methods of the embodiments described above, but configurations or manufacturing methods other than the embodiments may be appropriately carried out within the scope of the gist of the present invention.

DESCRIPTION OF REFERENCE NUMERALS AND SYMBOLS 1, 61: vehicle wheel
3: rim
10: outboard flange
12: outboard bead seat
21, 66: hollow portion
22: non-hollow portion (partition wall)
41: valve hole
53: vertical wall
67: non-hollow portion
101: air valve
T: tire
Va, Vb: bead

The invention claimed is:

1. A method for manufacturing a vehicle wheel having a rim including outboard and inboard bead seats for supporting a bead of a tire and a valve hole provided inside in a radial direction of the outboard bead seat for mounting an air valve, the method comprising the steps of:

forming an annular vertical wall which protrudes outward in the radial direction from an outer surface of the rim throughout the whole circumference, and forming a protruding portion which protrudes outward in the radial direction from the outer surface of the rim and has a larger cross section than a hole cross section of the valve hole and a recessed portion which has a smaller outer diameter than the protruding portion between an outboard flange and the vertical wall in series in a circumferential direction of the wheel;

forming the outboard bead seat configured with a bent vertical wall formed by bending the vertical wall toward the outboard flange and joining an end portion of the vertical wall to the outboard flange throughout a whole circumference, a hollow-state hollow portion configured with the bent vertical wall and the recessed portion, and a solid-state non-hollow portion configured with the protruding portion; and forming the valve hole in the non-hollow portion by a cutting process, the steps being sequentially conducted.

* * * * *